US006572951B2

(12) United States Patent
Hasegawa et al.

(10) Patent No.: US 6,572,951 B2
(45) Date of Patent: Jun. 3, 2003

(54) PRINTING SHEET

(75) Inventors: Makoto Hasegawa, Iwaki (JP); Noriko Kumazawa, Tokyo (JP); Akinobu Chatani, Tokyo (JP); Nobuo Nakanishi, Tokyo (JP); Ryuta Ono, Tokyo (JP); Hiroki Yamamoto, Tokyo (JP); Teruaki Ookawa, Tokyo (JP); Yasuo Yamamoto, Tokyo (JP)

(73) Assignee: Nippon Paper Industries Co., Ltd., Tokyo (JP)

( * ) Notice: Subject to any disclaimer, the term of this patent is extended or adjusted under 35 U.S.C. 154(b) by 0 days.

(21) Appl. No.: 09/819,517

(22) Filed: Mar. 28, 2001

(65) Prior Publication Data

US 2002/0051865 A1 May 2, 2002

(30) Foreign Application Priority Data

Mar. 31, 2000 (JP) ....................................... 2000-099434
Mar. 31, 2000 (JP) ....................................... 2000-099439
Mar. 31, 2000 (JP) ....................................... 2000-099442

(51) Int. Cl.[7] .................................................. B32B 3/10
(52) U.S. Cl. ....................... 428/141; 428/146; 428/220; 428/537.5; 101/128.21; 101/127
(58) Field of Search ................................ 428/141, 146, 428/220, 537.5; 101/127, 128.21

(56) References Cited

U.S. PATENT DOCUMENTS 4,581,996 A 4/1986 Platzer
6,332,953 B1 * 12/2001 Singh et al. ................ 162/123

FOREIGN PATENT DOCUMENTS

| | | |
|---|---|---|
| EP | 0 818 319 | 1/1998 |
| GB | 1 270 166 | 4/1972 |
| HU | 218 599 B | 7/1997 |
| JP | 63-309700 | 12/1988 |
| JP | 5-331796 | 12/1993 |
| JP | 6-171201 | 6/1994 |
| JP | 8-170297 | 7/1996 |
| JP | 9-250100 | 9/1997 |
| JP | 11-99670 | 4/1999 |

* cited by examiner

*Primary Examiner*—William P. Watkins, III
(74) *Attorney, Agent, or Firm*—Knobbe, Martens, Olson & Bear LLP

(57) ABSTRACT

A printing sheet which prevents setoff while transferring a sufficient quantity of ink and maintains necessary dot uniformity can be obtained by ensuring characteristics that the centerline average roughness showing the larger value is 1.0–3.5 $\mu$m and the ratio of centerline average obtained by dividing the larger value by the smaller value is less than 1.15 where said values are chosen at the point where the difference between the centerline average roughness in a certain direction and the centerline average roughness at right angles to said direction is maximal. Further, the above-mentioned quality is further improved by appropriately ensuring that the oil absorbability is more than 4 mg/cm$^2$ and less than 7 mg/cm$^2$ when the contact time between the oil component having a surface tension of 27–30 mN/m at 20° C. and the printing sheet is 5 seconds and/or that the median pore diameter is 1.7–3.5 $\mu$m, in addition to the abovementioned characteristics.

8 Claims, No Drawings

PRINTING SHEET

BACKGROUND OF THE INVENTION

1. Field of the Invention

The present invention relates to a printing sheet.

Further, the present invention relates to a printing sheet particularly suitable for stencil printing on which ink can be very well fixed in at high ink density, no setoff appears after printing, and a high image quality print without uneven printing can be obtained.

2. Description of the Related Art

A printing sheet on which ink can be very well fixed in at high ink density, ink is very well fixed, no setoff appears after printing, and a high image quality print without uneven printing can be obtained is in need for offset printing, gravure printing, letterpress printing, stencil printing, or the like.

Stencil printing is a generally known printing system represented by mimeograph printing and screen printing in which ink is transferred through a plate consisting of an image area, i.e., perforations through which ink can pass, and a non-image area, i.e., a membrane through which ink cannot pass, onto a printing sheet.

Today, in widely used stencil printing, a plate is made by an area corresponding to an image area of a film being directly melted by heat using a thermal head or the like to perforate and make dots on a stencil sheet which is generally made of a thermoplastic resin film. Printing is carried out through the perforation image thus formed in the perforated area. Namely, ink ejected from an ink supplying part mounted inside of the plate equipped on a plate cylinder is exuded through the perforations and transferred onto the surface of a printing sheet such as paper. Further, it is desirable that the printing be basically maintenance-free, that no washing be required after printing, and that the perforations do not become clogged with dried ink when ink is left for long periods till the next printing so that a good printed material can be obtained from the start of the next printing under various conditions.

Accordingly, printing inks for stencil printing having high stability, which are different from process inks used for ordinary printing, such as oil-based inks in which a coloring agent such as a pigment is dispersed in a vehicle such as mineral oil, and water-in-oil emulsion inks in which water is added to a vehicle, which is highly liquid and is not hardened by oxidation, light reaction or the like, have been invented and various improvements have been carried out (for example, Japanese Patent Publication No. S44-2165, Japanese Patent Publication No. S52-7370, Japanese Patent Application Laid-open No. H4-372671, Japanese Patent Application Laid-open H5-62628, and Japanese Patent Application Laid-open No. H5-117564). These inks can be left on a printing plate for a long period of time in a consistently stable state and are considered to be favorable for maintenance-free printing.

In stencil printing using heat-sensitive perforations, digitized plates can be easily made owing to the development of electronic equipment and peripheral devices. Further, a system applicable to a so-called computer-to-plate system, in which an image of a printing material can be made on a computer screen and the printing plate information can be transferred directly to a printing machine, is available, and at the same time, printing at a higher speed (120 sheets/minute) and at a higher resolution (600 dpi) is now possible. Thus, stencil printing is attracting attention once more because of its easy operation, low cost, and the like.

As mentioned above, the printing principle of stencil printing is entirely different from that of other printing systems, such as letterpress printing, gravure printing, and offset printing and thus, the quantity of ink to be transferred onto a printing sheet in stencil printing is much greater as compared to these other printing systems. Since conventional printing paper has poor ink absorbability, it causes problems when used as a printing sheet in stencil printing; namely, wet ink left unabsorbed on the printing layer of the paper after printing is transferred on the reverse side of the next printing material, namely, a phenomenon called setoff occurs, and the ink soils other printed materials, operators, working environment, or the like during handling of the printed materials. These are the problems to be primarily solved with the recent development of high-speed printers.

Japanese Patent Application Laid-open No. H4-183762 and Japanese Patent Application Laid-open H7-179799 propose improvement of ink fixing ability by controlling the diameter of an ink emulsion particle to 1–20 $\mu$m, and the diameter of a coloring agent particle in an ink emulsion to less than 0.4 $\mu$m. Further, Japanese patent Application Laid-open H8-73795 provides an ink having excellent permeability into a printing layer by controlling the average particle diameter and the specific surface area of a pigment used as a coloring agent. However, improvement of ink quality alone cannot solve all the problems so that studies in terms of the printing sheet have become urgent.

The size and shape of dots in stencil printing become uneven, for example, depending on the accuracy of perforation in plate making, control of the quantity of ink transfer during printing, and ink blur along fine voids on the printing layer as ink is absorbed through diffusion and permeation into the printing layer of the printing sheet. The lack of dot uniformity results in poor detail and quality of the printed material as compared to ordinary offset-printed material so that an improvement in quality is needed. On the other hand, unlike conventional mimeograph printing, stencil printing has shifted to tone expression by dots with the digitization of printing plates, wherein feathering can be expected to a certain extent when dot information perforated on a printing plate is transferred onto a printing sheet upon printing. Accordingly, white spots or other imperfections appear on the solid printed area if ink diffusion is not sufficient.

Conventionally, papers such as wood free paper and mechanical paper for plain paper copy (PPC paper) are generally used as stencil printing sheet because of their easy availability and low cost. There has been no sheet specific for stencil printing.

In order to prevent setoff after printing and further to improve print quality, various stencil printing sheets have been proposed. Japanese Patent Application Laid-open No. H5-331796 proposes a stencil printing paper which has an ink fixing layer consisting of diatomaceous earth as a pigment and a binder; Japanese Patent Application Laid-open No. H6-171201 proposes a stencil printing paper which has an ink absorbing layer consisting of a pigment having an oil absorbability of more than 45 ml/100 g and less than 120 ml/100 g and a binder; Japanese Patent Application Laid-open No. H9-250100 proposes a stencil printing paper which has an ink absorbing layer consisting of a pigment having an oil absorbability of more than 150 ml/100 g and a specific surface area of more than 200 $cm^2/g$ and a binder; Japanese Patent Application Laid-open No. H10-292292 proposes a stencil printing paper which has an ink absorbing layer consisting of an amorphous silica pigment having an oil absorbability of more than 150 m/100 g and an average particle diameter of 3–15 μm and a binder; and Japanese Patent Application Laid-open No. H11-99607 proposes a stencil printing sheet which has an ink receiving layer consisting of a resin-containing porous membrane having an average air hole diameter of 0.5–30 μm and a density of 0.1–0.8 $g/cm^3$.

However, all of these proposed papers have an ink receiving layer spread on a supporting sheet, and excessive ink absorbability suppresses dot diffusion too much instead of having an significant effect on preventing setoff and produces white spots on solid printed areas or dark areas to easily cause poor print quality.

Furthermore, Japanese Patent Application Laid-open No. S63-309700 shows that PPC paper can be modified to be fit for stencil printing at an air permeability of less than 15 seconds, an apparent density of 0.69–0.73 $g/cm^3$, and an ash content of 4–8%; however, the resulting paper is not satisfactory because of the compromise of the two kinds of papers. Furthermore, Japanese Patent Application Laid-open No. H8-170297 showed that a stencil printing paper having an oil absorbability of 18–30 $ml/m^3$ and an oil absorbing coefficient of 60–105 $ml/m^2\ S^{1/2}$ was effective in preventing setoff and fixing the ink; however image quality was not satisfactory in terms of evenness in half-tone printing and dot uniformity for the newer generation of printers with higher image quality.

In view of the above, an object of the present invention is to provide a printing sheet particularly suitable for stencil printing, which prevents setoff while transferring a sufficient quantity of ink and maintains necessary dot uniformity to provide high image quality printed materials without uneven printing.

SUMMARY OF THE INVENTION

As a result of various studies to solve the abovementioned problems, the present inventors found that setoff and dot uniformity under conditions in which a sufficient amount of ink transfer is maintained are correlated to the relatively macro voids (roughness) on the surface of the printing sheet, the oil absorbability of the printing sheet and/or the diameter of pores of the printing sheet, and that accordingly, in order to provide a printing sheet on which setoff hardly occurs, it is important to control the relatively macro roughness, in particular, the roughness of an area where roughness can be measured using an instrument for the measurement of surface roughness by the stylus method, namely, to maintain the ratio obtained by dividing the larger value by the smaller value within a specific range where said values are obtained at the point where the difference between the surface roughness in a certain direction and the centerline average roughness at right angles to said direction is maximal; and additionally that it is preferable to control oil absorption within a specific range during contact between the oil component and the printing sheet for a specified period of time by controlling absorbability of the sheet measurable using an oil component having a specified surface tension, and/or to control the diameter of pores.

Namely, the present inventors found that a stencil printing paper which prevents setoff while transferring a sufficient quantity of ink and maintains necessary dot uniformity is characterized in that (A) the surface roughness is adjusted such that, the centerline average roughness showing the larger value is 1.0–3.5 μm and the ratio of centerline roughness obtained by dividing the larger value by the smaller value is less than 1.15 where said values are chosen at the point where the difference between the centerline average roughness in a certain direction and the centerline average roughness at right angles to said direction is maximal, and thus arrived at the present invention. Further, it was revealed that the quality is further improved by appropriately ensuring in addition to the abovementioned characteristics, that (B) oil absorbability is more than 4 $mg/cm^2$ and less than 7 $mg/cm^2$ when the contact time between the oil component having a surface tension of 27–30 mN/m at 20° C. and the printing sheet is 5 seconds and/or that (C) the median pore diameter is 1.7–3.5 μm.

Further, the abovementioned surface roughness can be measured in accordance with JIS B0601 using an instrument for the measurement of surface roughness by the stylus method according to JIS B0651. The abovementioned pore diameter can be measured by mercury intrusion porosimetry in accordance with the J.TAPPI Paper Pulp Test Method No. 48. One of ordinary skill in the art could readily understand the above measurement and any measurement equivalent thereto.

Setoff can be prevented by increasing the absorbability of ink onto the printing sheet and the speed thereof It takes only about 0.5 second from the time when the printing sheet is sent to a stacker in a printing machine to the time when the next sheet is sent to the stacker. Generally, a stencil printer is not equipped with an ink drying device. Accordingly, in order to prevent setoff (to fix ink), the transferred ink has to be hardened, the vehicle has to evaporate, or the ink has to be moved from the outermost surface layer to the interior of the sheet in such a short period of time.

Since ink used for stencil printing or the like is generally a water-in-oil emulsion and does not contain a hardening component, the ink does not harden or the vehicle in the ink does not evaporate in a short period of time. Therefore, setoff can be prevented by rapidly transferring ink from the outermost surface layer to the interior (an area not in contact with the exterior) of a printing sheet. Generally, emulsion ink is less viscous and more liquid than processing ink for printing and can be further transferred relatively easily after being transferred onto a printing sheet. However, it is no so liquid that ink will be transferred between the time that one printed sheet is stacked and the next one is stacked in the stacker during printing. Accordingly, ink fixing has to be completed as soon as ink exuded from holes on the printing plate is transferred onto the printing sheet.

Furthermore, the present inventors carried out intensive studies on the utilization of pigments which are highly oil-absorbable and known to be effective for ink fixation, and found that the shape and form of the surface of the printing layer, as well as the material, have a great effect on quick ink fixation and further, the oil absorption capacity of an oil component having a specific surface tension, which can be measured as the volume of absorption onto the paper in a specified time, also has a great effect on ink fixation.

Furthermore, investigation by the present inventors revealed that print quality of printed materials varies depending not only on the uniformity of the shape of dots but largely on the uniformity of dot size, and printed materials having a better uniformity of dot size and a higher printing density give a favorable impression.

For purposes of summarizing the invention and the advantages achieved over the prior art, certain objects and advantages of the invention have been described above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description of the preferred embodiments which follow.

DETAILED DESCRIPTION OF THE PREFERRED EMBODIMENT

The present invention will be explained more in detail as follows.

In a printing sheet of the present invention, it is basically essential to control the roughness of an area, which can be measured by an instrument for the measurement of surface roughness by the stylus method, and the ratio of the surface roughness in a certain direction and that at right angles to said direction. In addition, it is effective to appropriately adjust the amount of oil absorption of the printing sheet and/or to control the diameter of pores of the printing sheet.

In the present invention, paper making is preferably carried out using a Fourdrinier machine, a twin-wire paper making machine or the like, followed by a smoothening process using a calender. Further, if necessary, the smoothening process is carried out after setting a coated layer, and the surface roughness is controlled so that the centerline average roughness of the larger value is adjusted to be 1.0–3.5 $\mu$m, preferably 1.0–2.5 $\mu$m, and the ratio of the centerline average roughness obtained by dividing the larger value by the smaller value is adjusted to be less than 1.15, preferably less than 1.10, where said values are chosen at the point where the difference between the centerline average roughness in a certain direction and that at right angles to said direction is maximal, to obtain the targeted printing sheet.

The measurement of surface roughness of a printing sheet of the present invention can be carried out according to the method of JIS B0601 using an instrument for the measurement of surface roughness by the stylus method in accordance with JIS B0651. If the larger value of centerline average roughness is less than 1.0 $\mu$m where said value is chosen at the point where the difference between the centerline average roughness in a certain direction and that at right angles to said direction is maximal, voids necessary for ink fixing is too little to retain a sufficient quantity of ink transfer, which results in a printing sheet in which setoff is easily generated. On the other hand, if the centerline average roughness of the larger value is more than 3.5 $\mu$m, unevenness on the surface of the printing sheet is too much to form uniform dots both in size and shape, which results in poor print quality of the printed materials. Furthermore, if the ratio of the centerline average roughness obtained by dividing the larger value by the smaller value is 1.15 or greater, anisotropy occurs in fixing ink onto a printing sheet, which interferes with making uniform dots. Thus, the abovementioned ranges for the characteristics of the printing sheet are appropriate.

Further, in addition to the above, the ink transfer can be further improved by adjusting the oil absorbability of a printing sheet to more than 4 mg/cm$^2$ and less than 7 mg/cm$^2$ when the contact time between the oil component having a surface tension of 27–30 mN/m at 20° C. and the printing sheet is 5 seconds. If the oil absorbability is less than 4 mg/cm$^2$, the vehicle in the ink is hardly absorbed into the sheet upon printing, which causes setoff and fabric wear. If the oil absorbability is 7 mg/cm$^2$ or greater, the vehicle in the ink is quickly diffused into the sheet so that the pigment in the ink hardly moves laterally, which results in frequent appearance of white spots on the solid printing area. Thus, the abovementioned range of oil absorbability is appropriate.

Examples of the abovementioned oil components include mineral oils such as motor oil, spindle oil, machine oil, and liquid paraffin; solvents such as vegetable oil, e.g., olive oil, castor oil, salad oil, soybean oil, or the like; emulsifying agents such as sorbitan higher fatty acid esters (e.g., sorbitan monooleate, sorbitan monopalmitate), fatty acid glyceride (e.g., oleic acid monoglyceride, oleic acid diglyceride) and ethylene oxide adducts, e.g., higher alcohols, alkyl phenols, and fatty acids; and vehicle components containing resins such as rosin resins, denatured rosin resins, phenolic resins, petroleum resin, alkyd resin, gum derivatives, and polymerized castor oil; and have a surface tension of 27–30 mN/m.

Furthermore, a printing sheet is satisfactory in terms of dot uniformity, setoff prevention, print density and fabric wear, when the larger value of centerline average roughness is 1.0–3.5 $\mu$m, and the ratio of the centerline average roughness obtained by dividing the larger value by the smaller value is less than 1.15, where said values are chosen at the point where the difference between the centerline average roughness in a certain direction and that at right angles to said direction is maximal, and the median pore diameter is controlled to be 1.7–3.5 $\mu$m, preferably 1.9–3.0 $\mu$m, which is measured by mercury intrusion porosimetry in accordance with the J. TAPPI Paper Pulp Test Method No. 48.

In the present invention, a printing sheet can be a base material as it is or with a coated layer on the base material; however, it is preferable to add a coated layer primarily consisting of a pigment and a water-emulsible polymer to improve dot uniformity and ink fixation and to increase printing density.

A base material for a printing sheet of the present invention can be any known supporting material such as paper, fabric, nonwoven fabric, paper sheets with a resin film pasted on the surface, and laminated paper.

Paper production is preferably carried out using a Fourdrinier machine, a twin wire machine or the like, followed by a smoothening process using a calender.

In the present invention, pulp to be used in paper making can be appropriately selected from chemical pulp of L woods and N woods, mechanical pulp, deinked pulp, or the like. The drainage rate of the pulp is preferably 200–500 ml c.s.f. Filler to be added to the paper can be appropriately selected from generally used filler including inorganic filler such as talc, kaolin, calcium carbonate, titanium oxide, zeolite and silica, various organic filler, or the like. The amount to be added is preferably less than 20%.

Preferably, a water-emulsible polymer alone or a coating material primarily consisting of a pigment and a water-emulsible polymer is coated onto at least one side of a paper made by admixing auxiliary agents with the abovementioned pulp and filler using an ordinary sizing press device, such as a two-roll size press, gate-roll size press, blade metering size press and rod metering size press, and then a smoothening process is carried out. However, it is necessary to control the amount of coating depending on the properties of individual materials since excessive coating of the abovementioned water-emulsible polymer alone or coating material primarily consisting of a water-emulsible polymer interferes with oil absorbability and water absorbability of the pulp and the formation of unevenness and pores having an appropriate diameter necessary for receiving ink.

The abovementioned water-emulsible polymer can be one or more of known polymers selected from starch, polyvinyl alcohol, carboxymethyl cellulose, casein, styrene-butadiene latex, acrylic emulsion and vinyl acetate emulsion. Furthermore, in cases where a coating material primarily consisting of a pigment and a water-emulsible polymer is used, examples of the pigment include inorganic pigments such as amorphous silica, kaolin, calcined clay, precipitated calcium carbonate, ground calcium carbonate, alumina, aluminium hydroxide, magnesium carbonate, satin white, aluminium silicate and colloidal silica; and organic pigments such as polyvinyl alcohol powder, starch powder, acrylic resin particles, epoxy resin particles, polypropylene resin particles and styrene resin particles. They can be used alone or in combination of two or more kinds. A starch powder, precipitated calcium carbonate and amorphous silica are preferably used and in particular, use of starch powder or a combination of starch powder and precipitated calcium carbonate is preferable. Furthermore, the water-emulsible polymer can be selected from casein, soybean protein, starch, polyvinyl alcohol, carboxymethyl cellulose, styrene-butadiene latex, acrylic emulsion, vinyl acetate emulsion, polyurethane, or the like, and be used alone or in combination of two or more kinds as a binder. The amount to be used is preferably 10–50 parts by weight per 100 parts by weight of pigment. Further, various auxiliary agents generally used in coating agents, such as a dispersing agent, flowability denaturing agent, antifoaming agent, dye, lubricant and water-retaining agent, can be added.

A coating material primarily consisting of a water-emulsible polymer or a pigment and a water-emulsible polymer can be coated using an on-machine coater or off-machine coater installed on the paper making machine. A coating device to be used can be appropriately selected from known coating devices such as a blade coater, air knife coater, roll coater, kiss coater, squeeze coater, curtain coater, bar coater, gravure coater, and comma coater. The coating can be a monolayer or two or more layers, as desired. The amount of coating can be appropriately adjusted within a range sufficient to cover the surface of the base material and to attain satisfactory ink fixation. However, in order to prevent setoff and to attain high image quality according to the present invention, the amount of coating, as solid, is preferably 0.1–30 $g/m^2$, in particular 3–25 $g/m^2$, per one side. The abovementioned base material is coated with the coating material, dried and then subjected to a smoothening process using a machine calender, soft calender, super calender, or the like to control surface average roughness, oil absorbability and/or pore diameter to obtain a printing sheet.

A printing sheet of the present invention is particularly suitable for stencil printing; however, it can be used also as offset printing paper, gravure printing paper, letterpress printing paper, electronic photocopying paper, and inkjet recording paper.

EXAMPLES

The present invention will be explained referring to the following examples; however, these examples are not to be construed to limit the scope of the invention.

Measurement and evaluation methods are as follows.

Evaluation Method (1) Centerline Average Roughness

Roughness was measured with reference to JIS B-0601 using a roughness measuring instrument SE-3C (a product of Kosaka Seisakusho Ltd; measuring conditions—stylus radius: 2 μm, measuring force: 0.7 mN, measuring speed: 0.5 mm/s, cut-off value: 0.8 mm) at every 10 degrees in all directions on the sheet with a measuring length of 16 mm. Direction for the evaluation was determined by a point where the difference in measurements in a certain direction and that at right angles to said direction is maximal. A test strip was moisturized at 20° C. under an atmosphere of 65% RH for more than 4 hours before the measurement.

(2) Amount of Oil Absorption

The measuring instrument and devices used were a board as shown in JIS P8140, a metal cylinder with an inner diameter of 7 cm (test areas of 38.5 $cm^2$), and a clamp and a non-oil absorbing gasket to fix the cylinder to the board.

By using this measuring instrument, the oil component can be quickly and uniformly brought into contact with a test site, the unabsorbed oil component can be readily removed from the test strip, and the test strip can be readily removed so that the oil component does not adhere to any site other than the test site. Further, the height of the cylinder in a test vessel is maintained so that overflow the oil component (10 ml) does not overflow.

Contact time is measured from the time the test strip is first brought into contact with the oil component up to the time blotting of the component with blotting paper starts.

Further, the oil component used in the present invention was a mixture of 16 parts by weight of #40 motor oil, 32 parts by weight of Nisseki No. 5 solvent, 13 parts by weight of sorbitan monooleate, and 39 parts by weight of alkyd resin, having a surface tension of 28.6 mN/m.

The measurement was carried out according to the following procedure.

A 10 cm square is cut to make a test strip. The test strip is moisturized at 20° C. under an atmosphere of 65% RH for at least 24 hours. The weight of the moist test strip is measured down to 1 mg. Ten test strips thus prepared are fixed onto the measuring instrument. The abovementioned oil component (10 ml) is poured into the metal cylinder. The cylinder is removed so that the time from when the oil component is poured up to the time of blotting the oil component is 5 seconds. The weight of the test strip upon oil absorption was measured down to 1 mg. The amount of oil absorption was calculated as follows:

$A=(m2-ml)/S$

A: Amount of absorbed oil (mg/$cm^2$)

m1: Weight of test strip upon moisturization. (mg)

m2: Weight of test strip upon oil absorption (mg)

S: Test area 38.5 ($cm^2$)

(3) Measurement of Median Pore Diameter by Mercury Intrusion Porosimetry

Pore size distribution was measured with reference to J. TAPPI Paper Pulp Test Method No. 48 using a pore sizer 9310 manufactured by Shimadzu Corp. From a cumulative curve of the pore diameters, the pore diameter at 50% accumulation was taken as the median diameter.

(4) Print Evaluation

Printing was carried out at 20° C. under an atmosphere of 65% RH.

RISOGRAPH GR377, a stencil printing machine manufactured by Riso Kagaku Kogyo K.K., was used under standard conditions.

RISOGRAPH GR Ink HD (black), manufactured by Riso Kagaku Kogyo K.K., was used as the ink.

Evaluation patterns, i.e., image data, were directly output from a personal computer to the printing machine via a data transfer unit (SC3000, a product of Riso Kagaku Kogyo K.K.) using a RISOGRAPH GR Master 77W manufactured by Riso Kagaku Kogyo K.K as a plate.

The evaluation patterns used were (i) a dot pattern (5–95%, 5% interval) and a solid printing pattern made by using PHOTOSHIP™ (image processing software) manufactured by Adobi Corp and (ii) a high definition color digital standard image (identification symbol: N1, image name: Portrait, made by Japan Standards Association) prepared with reference to JIS X9201.

1) Printing (Ink) Density

Ink density of solid printing portions was measured using an optical densitometer (RD-915, a product of Macbeth).

2) Setoff

Immediately after a plate was made using a solid printing pattern, 20 sheets were successively printed. Between discharge of the 19th printed sheet and the 20th printed sheet, an unprinted printing sheet was cast into the stacker to cover the 19th printed sheet and a load of 18 g/$cm^2$ was applied for 3 minutes. Then, ink transferred onto the cast sheet was evaluated for soiling caused by setoff by observing with the naked eye.

○○: Good with virtually no setoff

○: Setoff is slightly observed, but the sheet is still practically usable.

×: Setoff is severe so that the sheet is practically unusable.

3) Dot Uniformity

Immediately after plates were made using the N1 image pattern, 20 sheets were successively printed. The background part and a human face on the N1 image pattern printed on the 20 sheets were evaluated by observing with the naked eye.

○○: Excellent, ○: Good, ×: Poor

4) Fabric Wear

A fabric wear evaluation pattern on which a solid printing part and a non-printing part were alternately set at 10 mm intervals was printed on a printing sheet and the printed sheet was moisturized at 20° C. under an atmosphere of 65% RH for 24 hours. Then, a length of 10 cm on the resulting test strip was rubbed back and forth at a speed of 30 times/minute with reference to JIS L0949 using a Gakushin-type rubbing test machine with an attachment of size B (Kanakin size 3) head and a load of 200 g. Five rubbings were performed.

The level of wear was evaluated by observing with the naked eye (3 ranks).

○○: Good with virtually no wear.

○: Wear is slightly observed, but the sheet is still practically usable.

×: Wear is severe, so that the sheet is practically unusable.

Example 1

A slurry was prepared by admixing 10 parts by weight of talc to 100 parts by weight of hardwood bleached kraft pulp (drainage rate: 450 ml c.s.f.) and further adding 0.4 part by weight of an internal sizing agent, 0.8 part by weight of aluminum sulfate and 50 ppm of a retention aid. Paper having a weight of 90 g/$m^2$ was made using an on-top twin-wire-type paper making machine. Further, a liquid mixture consisting of 80 parts by weight of precipitated calcium carbonate, 20 parts by weight of starch particles, 15 parts by weight of styrene-butadiene resin latex, and 5 parts by weight of oxidized starch was coated on both sides to a level of 7 g dry weight/$m^2$ per side, using a bar coater. The degree of Oken type smoothness was adjusted to 85 seconds by calender treatment to obtain a stencil printing sheet.

Example 2

A slurry was prepared by admixing 10 parts by weight of talc to 100 parts by weight of hardwood bleached kraft pulp (drainage rate: 450 ml c.s.f.) and further adding 0.4 part by weight of an internal sizing agent, 0.8 part by weight of aluminum sulfate and 50 ppm of a retention aid. Paper having a weight of 128 g/$m^2$ was made using an on-top twin-wire-type paper making machine. Further, a liquid consisting of 11 parts by weight of an oxidized starch solution supplemented with 0.1% by weight of a surface sizing agent was coated on both sides to a level of 0.8 g dry weight/$m^2$ per side. The degree of Oken type smoothness was adjusted to 30 seconds by calender treatment to obtain a stencil printing sheet. Further, a sheet was coated on both side using a bar coater with a liquid mixture consisting of 100 parts by weight of amorphous silica, 4 parts by weight of a styrene-butadiene resin latex, 5 parts by weight of an ethylene-vinyl acetate copolymer resin emulsion, 20 parts by weight of polyvinyl alcohol, 5 parts by weight of a surface sizing agent, and 0.3 part by weight of an antifoaming agent in 23 g/m$^2$ per side. The degree of Oken type smoothness was adjusted to 120 seconds by calender treatment to obtain a test sample.

Example 3

A slurry was prepared by admixing 12 parts by weight of kaolin, 0.2 part by weight of an internal sizing agent, 0.6 part by weight of aluminium sulfate, and 100 ppm of a retention aid to 90 parts by weight of hardwood bleached kraft pulp and 10 parts by weight of softwood bleached kraft pulp (drainage rate of the mixed pulp: 350 ml c.s.f.). Paper having a weight of 72 g/m$^2$ was made using an on-top twin-wire-type paper making machine. Further, a liquid consisting of 7 parts by weight of an oxidized starch solution supplemented with 0.2% by weight of a surface sizing agent was coated on both sides to a level of 0.7 g dry weight/m$^2$ per side, using a two-roll sizing press. The degree of Oken type smoothness was adjusted to 35 seconds by calender treatment to obtain a stencil printing sheet.

Example 4

A slurry was prepared by admixing 16 parts by weight of zeolite and 180 ppm of a retention aid to 80 parts by weight of hardwood bleached kraft pulp and 20 parts by weight of softwood bleached kraft pulp (drainage rate of the mixed pulp: 270 ml c.s.f.). Paper having a weight of 64 g/m$^2$ was made using a Fourdrinier-type paper making machine. Further, a 6% by weight oxidized starch solution was coated on both sides to a level of 1.9 g dry weight/m$^2$ per side, using a sizing press. The degree of Oken type smoothness was adjusted to 20 seconds by calender treatment to obtain a stencil printing sheet.

Comparative Example 1

A slurry was prepared by admixing 10 parts by weight of talc to 100 parts by weight of hardwood bleached kraft pulp (drainage rate: 450 ml c.s.f.) and further adding 0.4 part by weight of an internal sizing agent, 0.8 part by weight of aluminum sulfate and 50 ppm of a retention aid. Paper having a weight of 64 g/m$^2$ was made using an on-top twin-wire-type paper making machine. Further, a liquid consisting of 11 parts by weight of an oxidized starch solution supplemented with 0.1% by weight of a surface sizing agent was coated on both sides to a level of 1.4 g dry weight/m$^2$ per side, using a sizing press. The degree of Oken type smoothness was adjusted to 30 seconds by calender treatment to obtain a stencil printing sheet.

Comparative Example 2

A slurry was prepared by admixing 12 parts by weight of kaolin, 0.2 part by weight of an internal sizing agent, 0.6 part by weight of aluminium sulfate, and 100 ppm of a retention aid to 90 parts by weight of hardwood bleached kraft pulp and 10 parts by weight of softwood bleached kraft pulp (drainage rate of the mixed pulp: 350 ml c.s.f.). Paper having a weight of 72 g/m$^2$ was made using an on-top twin-wire-type paper making machine. Further, a liquid mixture consisting of 70 parts by weight of precipitated calcium carbonate, 30 parts by weight of clay, 10 parts by weight of styrene-butadiene resin latex, 4 parts by weight of oxidized starch, and 0.3 part by weight of an antifoaming agent was coated on both sides to a level of 13 g dry weight/m$^2$ per side, using a bar coater. The degree of Oken type smoothness was adjusted to 85 seconds by calender treatment to obtain a stencil printing sheet.

Results are shown in Table 1

TABLE 1

| | Example | | | | Comparative Example | |
|---|---|---|---|---|---|---|
| | 1 | 2 | 3 | 4 | 1 | 2 |
| Ra1 | 1.45 | 1.57 | 2.38 | 2.87 | 2.71 | 0.83 |
| Ra2 | 1.42 | 1.55 | 2.10 | 2.83 | 2.31 | 0.79 |
| Ra ratio | 1.02 | 1.01 | 1.13 | 1.01 | 1.16 | 1.05 |
| Oil absorption (mg/cm$^2$) | 4.75 | 7.43 | 5.81 | 4.69 | 5.77 | 1.21 |
| Sheet median pore diameter (μm) | 1.99 | 2.02 | 4.06 | 2.78 | 2.23 | 1.41 |
| Ink density | 1.25 | 1.37 | 1.09 | 1.33 | 1.18 | 1.02 |
| Setoff | ○○ | ○○ | ○ | ○ | ○ | x |
| Dot uniformity | ○○ | ○○ | ○ | ○ | x | ○ |
| Fabric wear | ○○ | ○ | ○○ | ○ | x | x |

Ra1 and Ra2 in the Table are determined as follows. Namely, centerline average roughness on a sheet is measured in all directions at every 10 degrees and the point where the difference in roughness in a certain direction and roughness at right angles to said direction is maximal is determined. The larger value of surface roughness at said point is referred to as Ra1 and the smaller value of surface roughness is referred to as Ra2. The Ra ratio is Ra1/Ra2.

Possible Industrial Use

As mentioned above, the image quality was not satisfactory in terms of evenness in half-tone printing and dot uniformity for the newer generation of printers with higher image quality. However, the present invention could provide a printing sheet which was proved to prevent setoff while transferring a sufficient quantity of ink and maintain necessary dot uniformity to produce printed materials with high image quality and high ink density without uneven printing. Namely, the present invention can provide a printing sheet which prevents setoff while transferring a sufficient quantity of ink and produces high image quality.

What is claimed is:

1. A stencil printing sheet characterized in that the centerline average roughness showing the larger value is 1.0–3.5 μm and the ratio of centerline roughness obtained by dividing the larger value by the smaller value is less than 1.15, where said values are obtained at the point where the difference between the centerline average roughness in a certain direction and the centerline average roughness at right angles to said direction is maximal.

2. A printing sheet as claimed in claim 1, characterized in that the oil absorbability of said printing sheet is 4–7 mg/cm$^2$ as measured when the contact time between the oil component having a surface tension of 27–30 mN/m at 20° C. and the printing sheet is 5 seconds.

3. A printing sheet as claimed in claim 1 or 2, characterized in that the median pore diameter of said printing sheet is 1.7–3.5 μm.

4. A printing sheet as claimed in claim 1, 2 or 3, characterized in that said printing sheet has a coating layer primarily consisting of a pigment and a water-emulsible polymer.

5. A printing sheet as claimed in claim 4, wherein said pigment contains starch particles.

6. A printing sheet as claimed in claim 4, wherein said pigment contains precipitated calcium carbonate and starch particles.

7. A printing sheet characterized in that the centerline average roughness showing the larger value is 1.0–3.5 μm and the ratio of centerline roughness obtained by dividing at the larger value by the smaller value is less than 1.15, where said values are obtained at the point where the difference between the centerline average roughness in a certain direction and the centerline average roughness at right angles to said direction is maximal, said printing sheet having a coating layer comprising starch particles as a pigment and a water-emulsible polymer.

8. A printing sheet characterized in that the centerline average roughness showing the larger value is 1.0–3.5 μm and the ratio of centerline roughness obtained by dividing the larger value by the smaller value is less than 1.15, where said values are obtained at the point where the difference between the centerline average roughness in a certain direction and the centerline average roughness at right angles to said direction is maximal.

* * * * *